US008752148B1

(12) United States Patent
Vipond et al.

(10) Patent No.: US 8,752,148 B1
(45) Date of Patent: Jun. 10, 2014

(54) PROCESSORLESS TOKEN FOR PRODUCING A ONE-TIME PASSWORD

(75) Inventors: Edward W. Vipond, Gardner, MA (US); Karl Ackerman, Topsfield, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/532,309

(22) Filed: Jun. 25, 2012

(51) Int. Cl.
*G06F 17/30* (2006.01)
*H04L 29/06* (2006.01)
*H04K 1/00* (2006.01)
*G06F 1/26* (2006.01)
*H04L 9/32* (2006.01)

(52) U.S. Cl.
USPC ............ 726/6; 726/7; 713/168; 713/171; 713/172; 713/182

(58) Field of Classification Search
USPC ............ 726/6, 7; 713/168, 171, 172, 182
See application file for complete search history.

(56) References Cited

U.S. PATENT DOCUMENTS

| | | | |
|---|---|---|---|
| 6,173,400 B1 * | 1/2001 | Perlman et al. ............... | 713/172 |
| 6,411,715 B1 | 6/2002 | Liskov et al. | |
| 6,985,583 B1 | 1/2006 | Brainard et al. | |
| D516,929 S | 3/2006 | Vipond et al. | |
| 7,111,172 B1 | 9/2006 | Duane et al. | |
| 7,359,507 B2 | 4/2008 | Kaliski | |
| 7,363,494 B2 | 4/2008 | Brainard et al. | |
| 7,502,467 B2 | 3/2009 | Brainard et al. | |
| 7,793,851 B2 * | 9/2010 | Mullen .......................... | 235/493 |
| 7,831,837 B1 | 11/2010 | Duane et al. | |
| 8,234,696 B2 * | 7/2012 | O'Malley et al. .............. | 726/6 |
| 2005/0166263 A1 * | 7/2005 | Nanopoulos et al. ........... | 726/7 |
| 2012/0233675 A1 * | 9/2012 | Hird ............................ | 726/6 |

OTHER PUBLICATIONS

Lawrence O'Gorman (Comparing Passwords, Tokens, and Biometrics for User Authentication, IEEE 2003).*
Loreto Mateu et al. (Review of Energy Harvesting Techniques and Applications for Microelectronics, SPIE 2005).*

* cited by examiner

*Primary Examiner* — Saleh Najjar
*Assistant Examiner* — Oleg Korsak
(74) *Attorney, Agent, or Firm* — BainwoodHuang

(57) ABSTRACT

A processorless hardware token provides a one-time password for user authentication. The processorless hardware token contains a non-volatile memory upon which is stored a pre-produced sequence of one-time passwords. The processorless hardware token uses limited circuitry on a circuit board to read from the non-volatile memory and display a one-time password associated with a current interval. The displayed one-time password is then used for authentication by an authentication server that compares the one-time password displayed on the processorless hardware token with a one-time password retrieved from a copy of the pre-produced sequence of one-time passwords stored on the Authentication Server.

19 Claims, 6 Drawing Sheets

PROCESSORLESS TOKEN FOR PRODUCING A ONE-TIME PASSWORD

BACKGROUND

The present application relates to the field of securely connecting an electronic entity using a securely produced one-time password.

In the art of securely connecting to electronic assets, a hardware token is used to provide a user with a one-time password for allowing the user to securely connect or login onto an electronic asset.

The hardware token produces a one-time password by executing an encryption or hash algorithm on an on-token microprocessor. The algorithm takes a seed and a representation of the current time and produces a one-time password for a time period or a series of one-time passwords for the current and next few time periods. The one-time password is valid for a period of time after which the token must produce an additional one-time password for the next period.

SUMMARY

Unfortunately, the prior has drawbacks. For example, encryption and hash algorithms are known to be compute intensive and therefore a microprocessor must execute for a relatively long period of time to produce a one-time password or series of one-time passwords. Such execution uses power and drains the token's battery, thereby reducing the token's lifetime.

Additionally, the presence of a microprocessor on the hardware token increases the production costs of each manufactured token.

Further, while the seed used to generate the one-time password should only be known to the hardware token and an Authentication Server, there still is a risk of compromise.

The seed used to create the one-time password can be determined by differential power analysis (DPA). DPA is a form of power analysis that can be used by an attacker to compute the intermediate values within cryptographic computations by statistically analyzing data collected from multiple cryptographic operations.

As such, analysis of the hardware token can be performed to determine the seed and provide the ability to reproduce a one-time password on a device other than the hardware token.

In addition if the seed from the server, at the time of manufacture or in transit from manufacture to the server or hardware token is taken by an adversary and they know the algorithm, they can use this information to generate the same one time password as is being generated on the hardware token and server.

Like the one-time password being produced on the hardware token, the production of the one-time password or series of one-time passwords on an Authentication Server is also compute intensive. Thus, an Authentication Server attempting to authenticate hundreds of one-time passwords simultaneously may need to produce so many one-time passwords that some users attempting to authenticate are rejected as the clock on the Authentication Server may roll to the next time interval prior to the attempt to compare one-time passwords.

It is the object of the present invention to provide a processorless hardware token that provides a one-time password to allow authentication of a user or entity.

For example, a user is assigned a processorless hardware token by his or her employer for access to employer servers. On the processorless hardware token is a pre-produced sequence of one-time passwords stored in a non-volatile memory. The pre-produced sequence of one-time passwords are unique to the processorless hardware token and are produced using at least a random seed and value indicative of a time interval or a sequence of events in the lifetime of the hardware token. The pre-produced sequence of one-time passwords is stored on the non-volatile memory of the hardware token at the time of the tokens manufacture.

When the user intends to use an application or device that requires his identity to be authenticated the user reads the one-time password displayed on the display of the processorless hardware token. The one-time password displayed on the display of the processorless hardware token is retrieved from the non-volatile memory by indexing into the non-volatile memory to retrieve an element containing the one-time password for the current time interval or event. The index is determined by adjusting a numeric value representative of the current time by a time associated with the first element of the pre-produced sequence of one-time passwords.

The indexing and displaying of the one-time password is performed by a circuit board with limited functionality that allows for only the retrieval of the one-time password and display of the one-time password.

The user reads the one-time password displayed on a display of the processorless hardware token, enters the one-time password into a user device and a client program on the user device causes the one-time password to be transmitted to an Authentication Server. On the Authentication server the one-time password for the current time interval is retrieved from a copy of the pre-produced sequence of one-time passwords stored thereon. The one-time password retrieved from a copy of the pre-produced sequence of one-time passwords by indexing in to the sequence using the same process as the processorless hardware token indexes into the non-volatile memory.

Upon the one-time password transmitted to the Authentication Server and the one-time password retrieved from the copy of the pre-produced sequence of one time passwords being equal, the user is considered authentic and is approved to login to or access a Secure Server.

For further protection of the pre-produced sequence of one-time passwords stored on the Authentication Server, the sequence of one-time passwords may be hashed prior to storage using a one-way function taking as parameter a key associated with each processorless hardware token, and a key associated with the intended server. If the sequence of one-time passwords is hashed, then it is necessary to hash the one-time password transmitted for authentication using the one-way function and the key or keys associated with the hardware token and Authentication Server that produced the one-time password prior to comparison for authentication.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

A system is described for the manufacture and use of a processorless hardware token. The system allows for use of a token that provides a non-volatile memory upon which a pre-produced sequence of one-time passwords is stored. The pre-produced sequence of one-time passwords is written to the non-volatile memory of the hardware token and a circuit board capable of displaying or otherwise outputting the value is used to index into the non-volatile memory to retrieve a one-time password used by an authentication system to authenticate a user or an entity.

Figure 1:
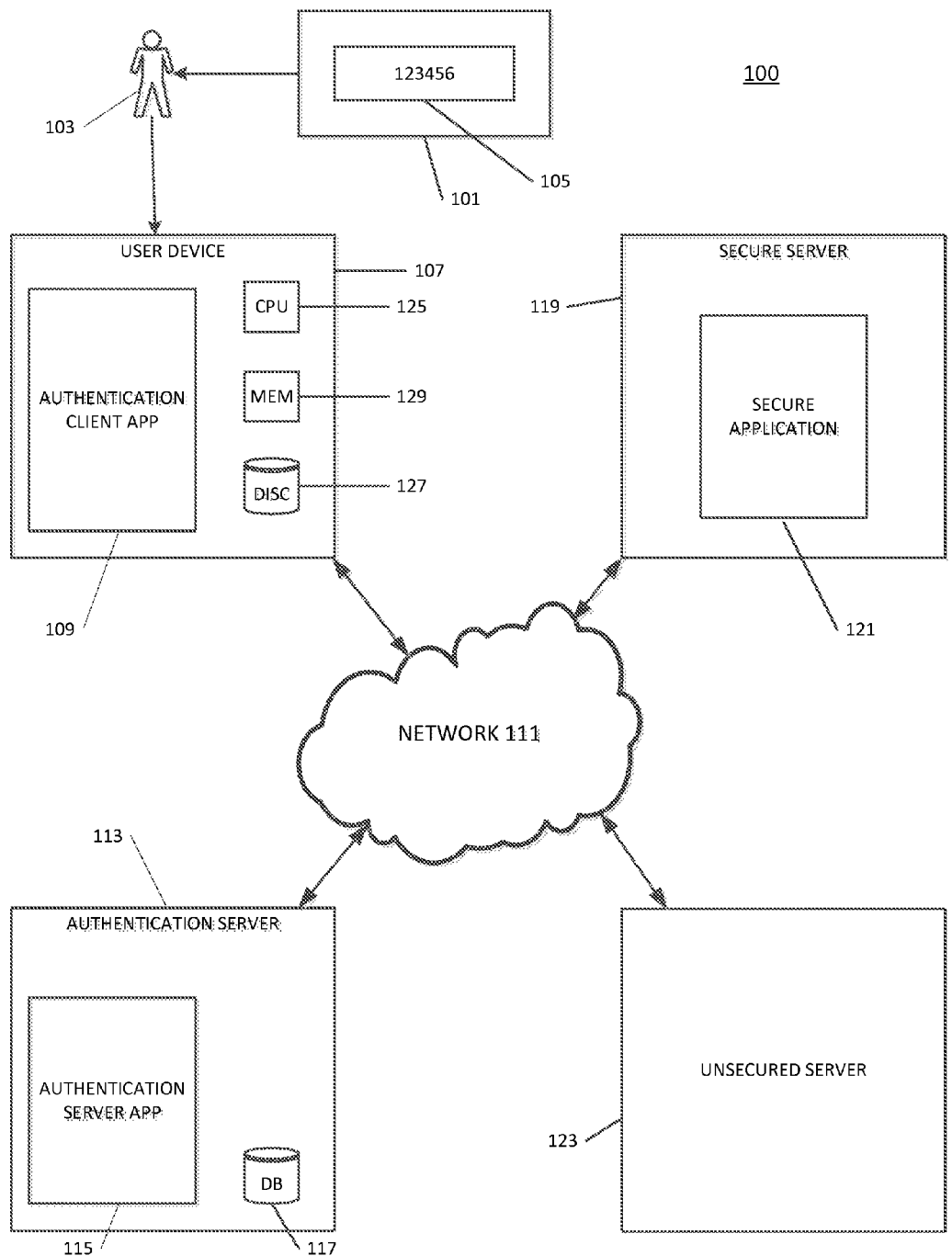
FIG. 1 is a block diagram of an authentication system that uses a processorless hardware token to produce a one-time password to authenticate an entity.

FIG. 1 is a block diagram of an authentication system 100 for manufacture and use of a processorless hardware token 101. A user 103 carries or otherwise has available the processorless hardware token 101, that displays the one-time password 105 on a display device (not referenced) of the processorless hardware token 101. In an alternative embodiment, the processorless hardware token 101 uses, for example, NearField communication or a physical connection to provide the one-time password for use by the authentication client. The processorless hardware token 101 use an electronic circuit (not shown) to retrieve the one-time password 105 that is entered into a user device 107 upon prompting by an authentication client 109 executing on the user device 107. In an alternative embodiment, the prompting is automated and a request for the one time password 105 is sent directly to the hardware token 101 which would provide the one time password 105 automatically without human assistance.

The Authentication System 100 also includes a network 111 that connects the user device 107 to the Authentication Server 113, a Secure Server 119 and Untrusted Server 123.

The Authentication Server 113 includes an Authentication Server Application 115 that authenticates one-time password 105 to authorize access by the user device to the Secure Server 117 running a Secure Application 121.

Those of ordinary skill in the art will recognize that the user device 107 may be, for example, any of a lap top, a desk top computer, smart phone, PDA and other end-user devices.

The user device 107 also includes a processor 125 that can load a program stored on the disc 127 into a memory 129 for execution by the processor 125, for example, the secure client application 109.

Figure 2:
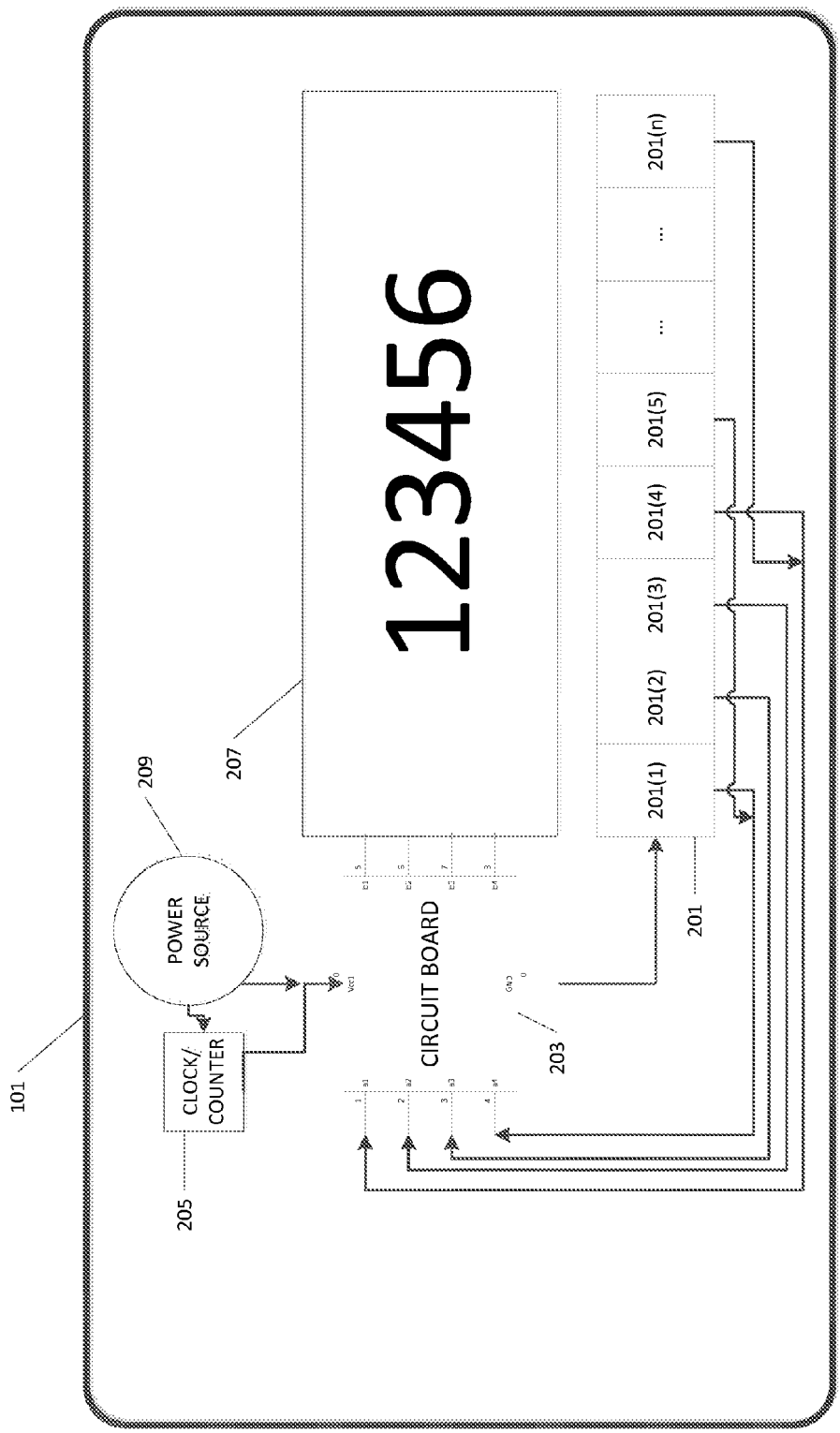
FIG. 2 is a diagram of a processorless hardware token used to provide a one-time password to an entity.

FIG. 2 is a diagram of the processorless hardware token 101 used to provide a one-time password 105. The processorless hardware token 101 includes a non-volatile memory 201 includes elements 201(1)-(n) for storage of all the one-time passwords that will be used for a lifetime of the processorless hardware token 101. Each element contains approximately 20 bits of data for the display of a six digit one-time password. Thus, for the processorless hardware token 101 that produces a new one-time password every minute, approximately 5,256, 000 ($60_{minutes} * 24_{hours} * 365_{days} * 10_{years}$) 20 bit elements or 13 MB of data non-volatile memory will be required for a ten year lifetime.

The processorless hardware token 101 further provides a circuit board 203 which retrieves a one-time password from the non-volatile memory 201 based upon an index generated from the current time held in a clock/counter 205 that references an element 201(index). The retrieved one-time password 105 is displayed on a display 205. Like a prior art hardware token, the processorless hardware token 101 includes a power source 209, for example, a battery. The power source 209 may also be a passive or energy harvesting device, that receives power from a solar cell, thermal energy, or kinetic energy to name a few. As the processorless hardware token 101 does not include a microprocessor and uses only the circuit board 203 to retrieve and display the one-time password, considerably less power is consumed, thereby extending the lifetime of a battery or reducing the size of a solar cell or reducing the power needed to be harvested by other passive power sources of the processorless hardware token 101.

Also, as no microprocessor is included in the processorless hardware token 101, the production cost for such a device are greatly reduced In use of the authentication system 100, the user 103 wishes to access the secure server 119 to use secure application 121. The user either views a constantly displayed one-time password 105 on the processorless hardware token 101 or requests the one-time password 105 by pressing a button (not shown) on the processorless hardware token 101 that is then displayed on the display 205 of the hardware token 101. In addition to triggering display or transmission of the one-time password 105 by pressing a button, light, motion or RF signals may also be used to trigger the request. The one-time-password 105 displayed on the display 205 of the processorless hardware token 101 is retrieved from the non-volatile memory 201 by indexing based upon the current time.

The index can simply be, for example, the number of minutes expended since the epoch of the clock adjusted by the number of minutes since the epoch of the clock for the time associate with the first element of the sequence of one-time passwords stored in the non-volatile memory 201. In other words where the time is the number of minutes since the epoch of the clock, the index is determined as:

$$index = (time(\ ) - time(first\ sequence\ element))$$

In an alternative embodiment, the index can simply be a counter indicative of the number of times a user 103 has requested a one-time passwords on the processorless hardware token 101.

The user 103 then takes the one-time password 105 and enters it into an input field (not shown) displayed on the user device 107 by the authentication client application 109. The one-time password 105 is transmitted across Network 111 to the Authentication Server 113 where the Authentication Server Application 115 determines its authenticity.

The Authentication Server Application 115 reads the pre-produced sequence of one-time passwords stored in the database 117 and determines the element in the sequence of one-time passwords in the same manner as the processorless hardware token 101 determines the index. The Authentication Server Application 115 compares the one-time password 105 with the one-time password stored in the database 117 of the Authentication Server 113 and if they are equal the user is authenticated and a key for access to the Secure Server 119 is transmitted back to the user device 107.

If the values compared are not equal an error code is returned to the user device 107 or lack of return data can also indicate failure. In alternative embodiment it may be necessary to read elements in surrounding indexes of the copy of pre-produced sequence of one-time passwords for comparison in cases of clock drift between the clock or counter 205 of the processorless hardware token 101 and the clock or counter (not shown) of the Authentication Server 115.

Figure 3:
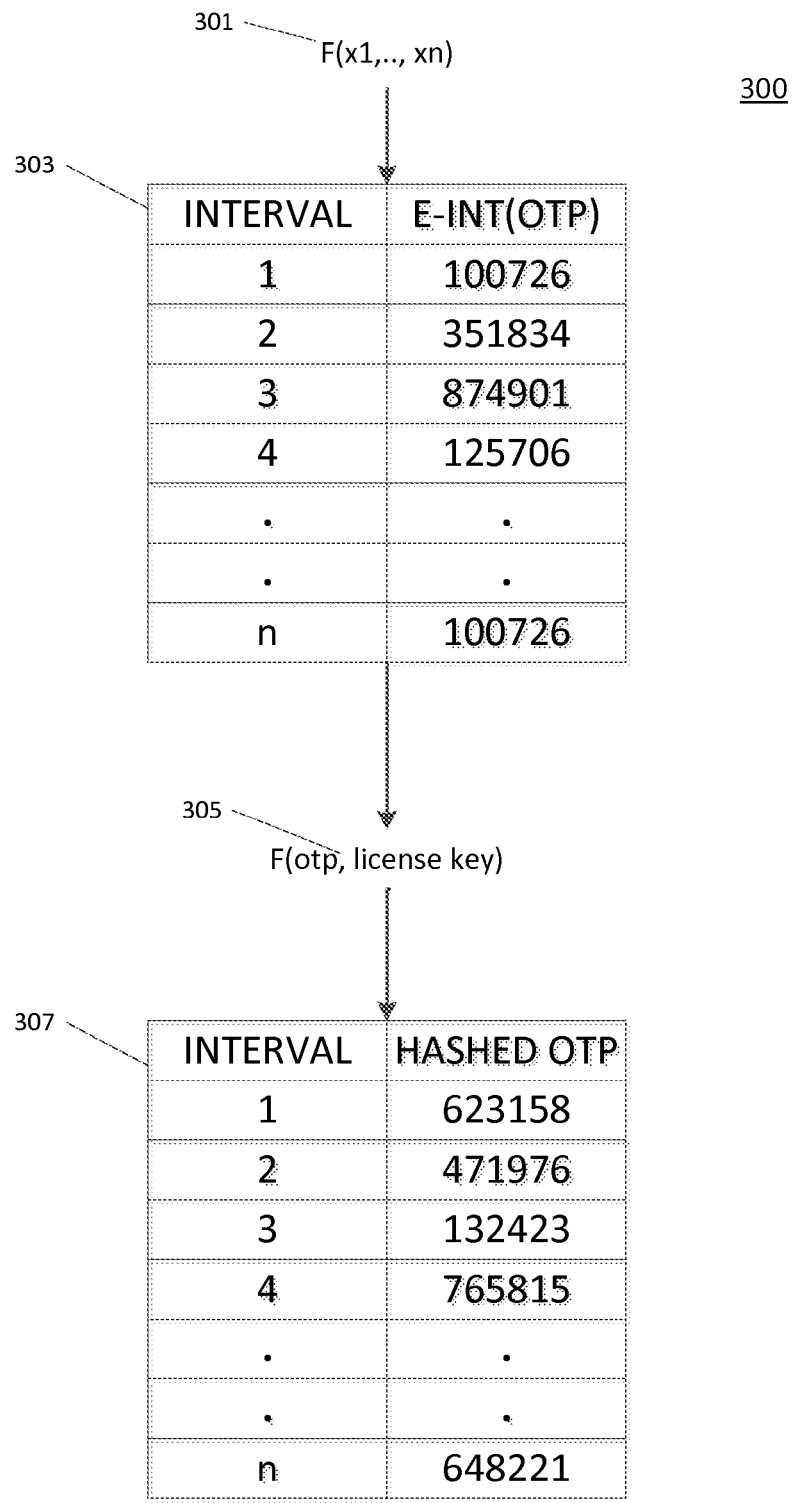
FIG. 3 is a diagram of the production and sequences of one time passwords used to authenticate an entity.

FIG. 3 is a diagram of the production and use of sequences of one time passwords 303 used to authenticate an entity. Function 301 converts a seed and time value for a time interval to a one-time password. A sequence of one-time passwords 303 is produced by iterating from a time interval when the lifetime of a given hardware token shall begin through the lifetime of a given hardware token shall end producing a one-time password for each one-minute interval of the lifetime. While in a preferred embodiment the time interval is a minute, it is understood that other periods, fraction of minutes, multiples of minutes and hours could be used.

In an alternative embodiment, a time interval will not be used, but instead a sequence number for events. For example, the number of times a user presses a button (not shown) on the processorless hardware token 101 requesting a one-time password. Thus, one-time password for sequence 1 through n, where n equals the number of elements in the non-volatile memory 201, will be created.

To provide further security the sequence of one-time passwords 303 that are stored on the Authentication Server 113 are converted via a one-way function 305. Such a one-way function may be, for example, Secure Hash Algorithm (SHA) 1024. After each one-time password for the intervals is hashed with a license key, a new sequence of hashed one-time passwords 307 is created. The sequence of hashed one-time passwords 307 is stored on the Authentication Server 113 along with the License Key associated with the processorless hardware token 101. When user 103 requests authentication, it is understood that the one-time password forwarded to the Authentication Server 113 will also need to be converted by the one-way function using the License Key associated with the processorless hardware token 101 prior to comparison with the sequence of hashed one-time passwords 307 is stored on the Authentication Server 113.

Additional hash techniques beyond a one-way function (i.e. salt and pepper) may be used to further protect the sequence of one-time passwords in a deterministic manner.

Figure 4:
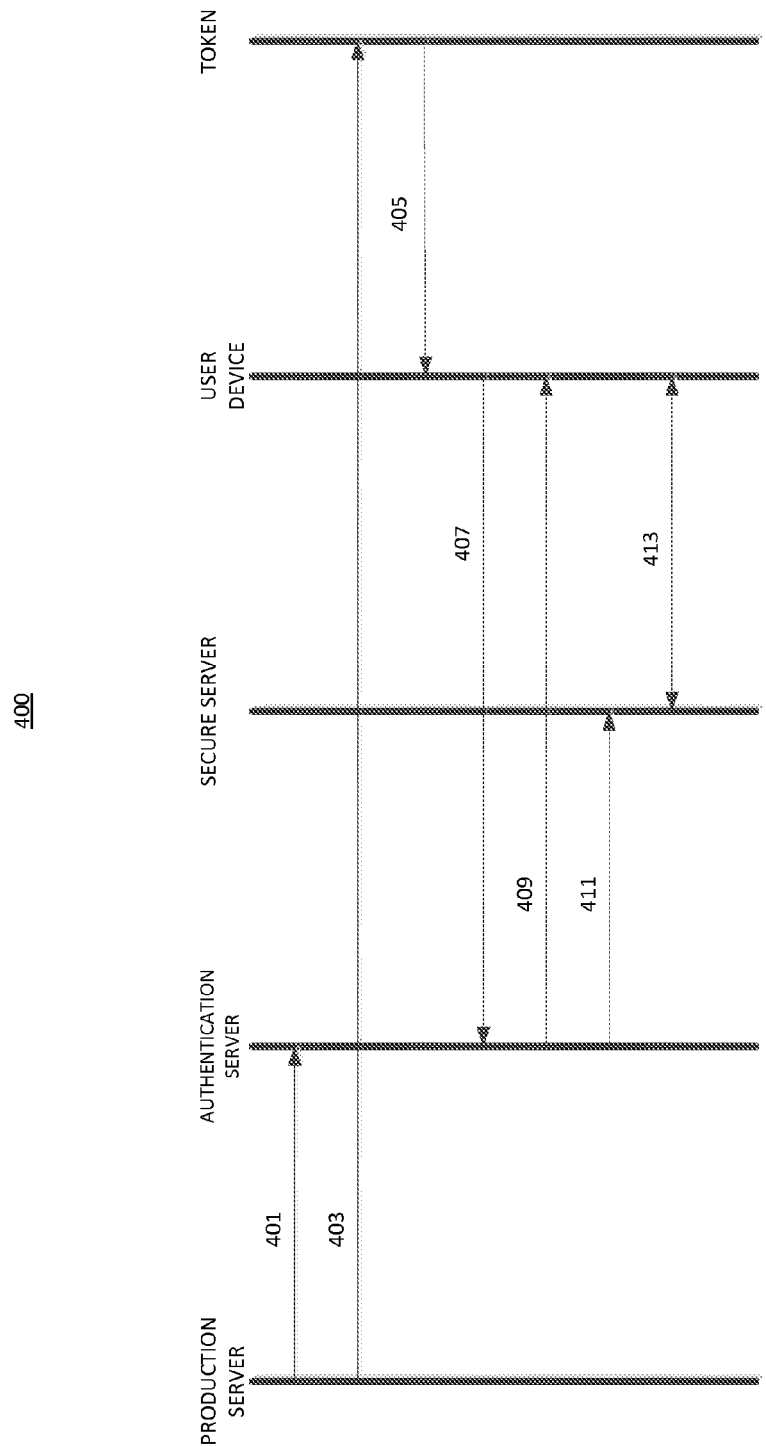
FIG. 4 is a flow diagram of the creation and use of a sequence of one-time passwords by a processorless hardware token used to authenticate an entity.

FIG. 4 is a flow diagram 400 of the creation and use of a sequence of one-time passwords by a processorless hardware token used to authenticate an entity or user 103.

A Production Server is the server that creates the sequence of one-time passwords. The Production Server distributes 401/403 the sequence of one-time passwords to the processorless hardware token 101 and to the Authentication Server 113. It is understood that the sequence of one-time passwords is forwarded to a manufacturing facility (not shown) with a device for writing the data to processorless hardware token 101.

Once the processorless hardware token 101 stores the sequence of one-time passwords on the non-volatile memory 201, it is ready for use. After distribution to a user, the user of the token 103 either reads a continually displayed or requested one-time password 105. The use enters 405 the one-time password 105 in the user device 107 and it is transmitted 407 to the Authentication Server 113. The Authentication Server authenticates the one-time password 105 and if it is valid, a key is distributed 409 to the Secure Server 119. A complementary key is distributed 411 to the user device 107 allowing access to the Secure Application 121 by communication 413 between the Secure Server 119 and user device 107.

Figure 5:
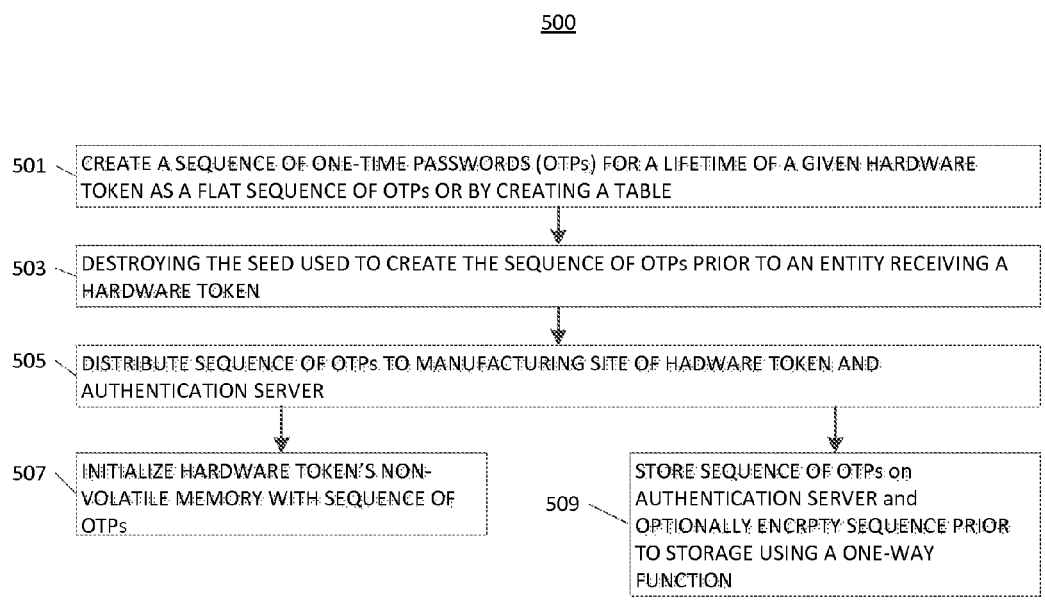
FIG. 5 is a flowchart illustrating the creation of a sequence of one-time passwords and the distribution of the one-time passwords to a manufacturing plant to initialize the hardware token and to an authentication server.

FIG. 5 is illustrates a method 500 for creating a sequence of one-time passwords 303 and the distribution of the sequence of one-time passwords 303 to the processorless hardware token 101 and the Authentication Server 113. In step 501 the sequence of one-time passwords 303 are created by an algorithm 301 using a random seed for each individual processorless hardware token 101. The sequence of one-time passwords 303 may be a flat index or a table. The table is also a flat sequence of, for example, 1024 one-time passwords where multiple elements are read and XORed together to produce one-time passwords used in authentication. It is understood that the number of elements in the table can be variable according to the needs and lifetime of the processorless hardware token 101.

Next, at step 503 the seed used by the algorithm 301 is destroyed as the sequence of one-time passwords 303 has been pre-produced in step 501. Neither the processorless hardware token 101 nor the Authentication Server 113 needs to reproduce a one-time password by means of the algorithm.

At step 505, the sequence of one-time passwords 303 of one-time passwords for each individual processorless hardware token 101 are distributed to a manufacturing facility for initializing the processorless hardware token 101 by writing the sequence of one-time passwords 303 in step 507 to the non-volatile memory 201 of the processorless hardware token 101. The same sequence of one-time passwords 303 is stored in step 509 to the database 117 of the Authentication Server 113.

Figure 6:
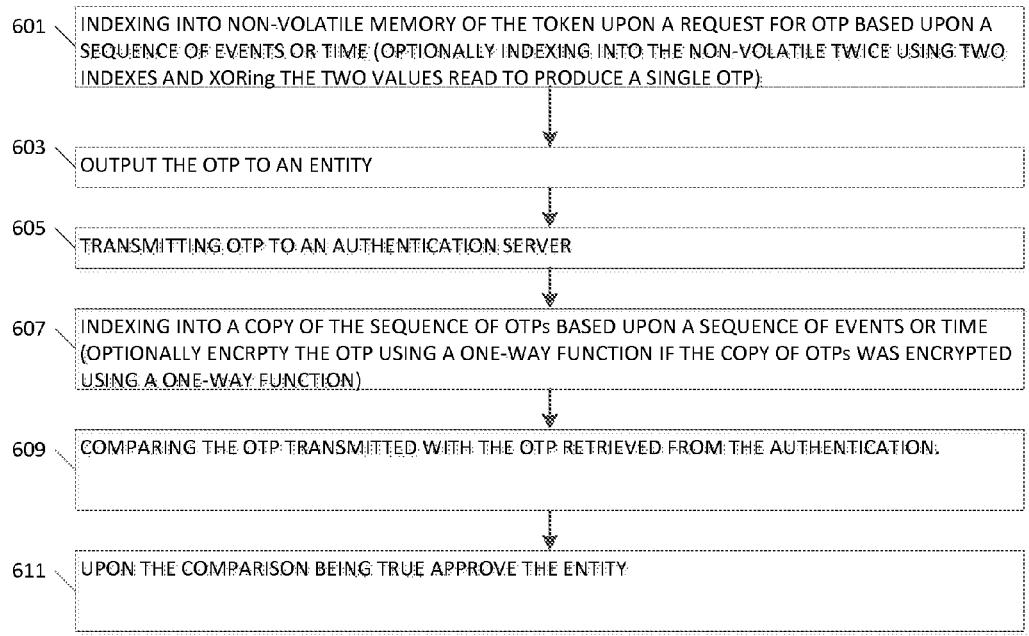
FIG. 6 is a flowchart illustrating the authentication of an entity using a processorless hardware token.

After steps 507 and 509, the method 600 of FIG. 6 can then be performed for the authentication of the user 103. In step 601, in response to, for example, a clock interval rolling to the next minute, the processorless hardware token 101 indexes into the memory using as an index the number of minutes that have elapsed since the epoch of the clock/counter 205 to get the correct element of the non-volatile memory 201. Where the sequence of one-time passwords 303 is a table, the index can be divided into two values by dividing the time value by the number of elements in the sequence of one-time passwords 303, taking the whole number result as a first index and the remainder as a second index. The first index is used to read a first one-time password and the second index to read the second one-time password XORing the first and second one-time passwords to create the one-time password 105. It is also understood that two counters could be used, the second counter rolling over into the first counter when the second counter reaches its terminal value and returns to zero.

Once the one-time password 105 has been read from the non-volatile memory 201, it is outputted by displaying the one-time password 105 so it can be read by the user 103 or another entity and the user-device 107 transmits the one-time password to the Authentication Server 113 for authentication by the Authentication Server Application 115.

In Step 607, the Authentication Server Application 115 indexes into the copy of the one-time passwords stored for the given processorless hardware token in the database 117. It is understood that the Authentication Server Application 115 retrieves the copy of the one-time password in the same manner as the processorless hardware token 101. If the sequence of one-time passwords 303 has been further hashed using a one-way function 305 to create the hashed one-time passwords 307, a key associated with the processorless hardware token 101 will be used to convert the transmitted one-time password 105.

In Step 609, the one-time password 105 transmitted to the Authentication Server 113 is compared with the copy of the one-time password stored in the database 117.

Then in step 611, if the two values are found to be equal (i.e. TRUE), the entity/user 103 is approved for access to the secure server 119 or other devices.

While various embodiments of the present disclosure have been particularly shown and described, it will be understood by those skilled in the art that various changes in form and details may be made therein without departing from the spirit and scope of the present disclosure as defined by the appended claims.

For example, while the system 100 discusses a system in terms of client/server, but in other embodiments could be peer-to-peer.

What is claimed is:

1. A method of authenticating an entity using a one-time password, the method comprising:
   initializing a non-volatile memory of a hardware device with a pre-produced sequence of one-time passwords, each one-time password in the pre-produced sequence of one-time passwords being produced by an algorithm;
   indexing into the non-volatile memory of the hardware device upon a request for a one-time password to read the one-time password; and
   outputting the one-time password to the entity;
   wherein indexing includes dividing a numeric value used for indexing by a number of one-time password elements in the non-volatile memory, using the result as the offset to read a first one-time password from the non-volatile memory, using the remainder of the division as an offset to read a second one-time password from the non-volatile memory, and exclusive-oring the first one-time password and the second one-time password to produce the one-time password.

2. The method of authenticating the entity as in claim 1, further comprising:
   transmitting the one-time password to an authentication server;
   indexing into a copy of the pre-produced sequence of one-time passwords stored on the authentication server to read an authentication one-time password; and
   comparing the one-time password with the authentication one-time password to authenticate whether the entity is legitimate.

3. The method of authenticating the entity as in claim 2, further comprising:
   approving the entity upon the comparing being true.

4. The method of authenticating the entity as in claim 2, further comprising:
   hashing each one-time password in the copy of the pre-produced sequence of one-time passwords via a one-way function prior to storage of the pre-produced sequence of one-time passwords on the authentication server; and
   hashing the one-time password via the one-way function prior to comparison with the authentication one-time password.

5. The method of authenticating the entity as in claim 1 wherein indexing into the non-volatile memory of the hardware device upon the request for the one-time password occurs while the entity possesses the hardware device;
   wherein the algorithm uses a seed to create the pre-produced sequence of one-time passwords; and
   wherein the method further comprises:
      rendering un-recoverable the seed used by the algorithm to create the pre-produced sequence of one-time passwords upon creation of the pre-produced sequence of one-time passwords and prior to the entity obtaining possession of the hardware device.

6. The method of authenticating the entity as in claim 1, wherein initialization of the non-volatile memory of the hardware device with the pre-produced sequence of one-time passwords is performed at time of manufacture of the hardware device.

7. The method of authenticating the entity as in claim 1, wherein indexing includes using a numeric value representative of a current time as an offset into the non-volatile memory.

8. The method of authenticating the entity as in claim 1, wherein indexing includes using a numeric value representative of a number of times the entity has requested the one-time password as an offset into the non-volatile memory.

9. The method of authenticating the entity as in claim 1, wherein the indexing and outputting of the one-time password on the hardware device are performed by electronic circuitry, which is constructed and arranged to retrieve the one-time password from a location in non-volatile memory based on an index to alleviate involvement of any hardware encryption or hash functionality while the one-time password is retrieved.

10. A hardware device for producing a one-time password, the hardware device comprising:
    a non-volatile memory, the non-volatile memory including a pre-produced sequence of one-time passwords, each one-time password in the sequence of pre-produced one-time passwords comprising an algorithm result;
    a circuit board coupled to the non-volatile memory, the circuit board being constructed and arranged to read the one-time password from the non-volatile memory by using an index value to determine a location of the one-time password in the non-volatile memory; and
    an output device coupled to the circuit board, the output device being constructed and arranged to output the read one-time password;
    wherein the circuit board is configured to read the one-time password by dividing the index value by a number of one-time password elements in the non-volatile memory, using the result as the offset to read a first one-time password from the non-volatile memory, and using the remainder of the division as an offset to read a second one-time password from the non-volatile memory, the first one-time password and the second one-time password exclusive-ored to produce the one-time password.

11. The hardware device as in claim 10, wherein the pre-produced sequence of one-time passwords is stored in the non-volatile memory at time of manufacture of the hardware device.

12. The hardware device as in claim 10, wherein the index value is a numeric value representative of a current time.

13. The hardware device as in claim 10, wherein the index value is a numeric value representative of a number of times the entity has requested the one-time password.

14. The hardware device as in claim 10, wherein the circuit board, when reading the one-time password from the non-volatile memory, is constructed and arranged to retrieve the one-time password from the location in the non-volatile memory based on the index to alleviate involvement of any of hardware encryption or hash functionality while the one-time password is read.

15. The hardware device as in claim 10, further comprising:
    a power source that provides energy via energy harvesting.

16. A computer readable storage medium with a computer program stored thereon, the computer program upon execution by a processor performing a method of authenticating an entity using a one-time password, the method comprising:

initializing a non-volatile memory of a hardware device with a pre-produced sequence of one-time passwords, each one-time password in the pre-produced sequence of one-time passwords being produced by an algorithm;

indexing into the non-volatile memory of the hardware device upon a request for a one-time password to read the one-time password; and outputting the one-time password to the entity;

wherein indexing includes dividing a numeric value used for indexing by a number of one-time password elements in the non-volatile memory, using the result as the offset to read a first one-time password from the non-volatile memory, using the remainder of the division as an offset to read a second one-time password from the non-volatile memory, and exclusive-oring the first one-time password and the second one-time password to produce the one-time password.

17. The computer readable storage medium as in claim 16, further comprising:

transmitting the one-time password to an authentication server;

indexing into a copy of the pre-produced sequence of one-time passwords stored on the authentication server to read an authentication one-time password; and comparing the one-time password with the authentication one-time password.

18. A method of authenticating an entity using a one-time password, the method comprising:

initializing a non-volatile memory of a hardware device with a pre-produced sequence of one-time passwords, each one-time password in the pre-produced sequence of one-time passwords being produced by an algorithm;

indexing into the non-volatile memory of the hardware device upon a request for a current one-time password to read the one-time password; and outputting the one-time password to the entity;

wherein indexing includes (i) deriving, from a numeric value used for indexing, a first index and a second index, (ii) reading a first one-time password from the non-volatile memory using the first index, (iii) reading a second one-time password from the non-volatile memory using the second index, and (iv) combining the first one-time password and the second one-time password together to produce the current one-time password.

19. A method as in claim 18 wherein combining the first one-time password and the second one-time password together to produce the current one-time password includes:

performing an exclusive-OR operation to generate the current one-time password, the exclusive-OR operation using at least a portion of the first one-time password as a first input and at least a portion of the second one-time password as a second input.

* * * * *